No. 878,389. PATENTED FEB. 4, 1908.
M. J. HENRY.
PUMP.
APPLICATION FILED JUNE 6, 1907.

Witnesses:

Inventor:
Milton J. Henry

UNITED STATES PATENT OFFICE.

MILTON J. HENRY, OF OAK PARK, ILLINOIS.

PUMP.

No. 878,389.  Specification of Letters Patent.  Patented Feb. 4, 1908.

Application filed June 6, 1907. Serial No. 377,493.

*To all whom it may concern:*

Be it known that I, MILTON J. HENRY, citizen of the United States, residing at Oak Park, in the county of Cook and State of Illinois, have invented a certain new and useful Improvement in Pumps, of which the following is a full, clear, concise, and exact description.

My invention relates to pumps for raising liquids, and more specifically for use in elevating the cream from milk in bottles without withdrawing the milk. Heretofore the methods for doing this have been imperfect, inasmuch as they did not provide means for removing the cream without partially inverting the bottle, and this always allowed the cream to become mixed more or less with the milk. I have taken advantage of the fact that the heavier liquid, or milk, in this case seeks the lower level in the bottle, and by inserting the pump, which, in its normal condition, resembles a pencil or long narrow cylinder, and then inflating the bulb which is attached thereto, the level of the liquids in the bottle may be raised without disturbing their relative positions.

Figure 1:
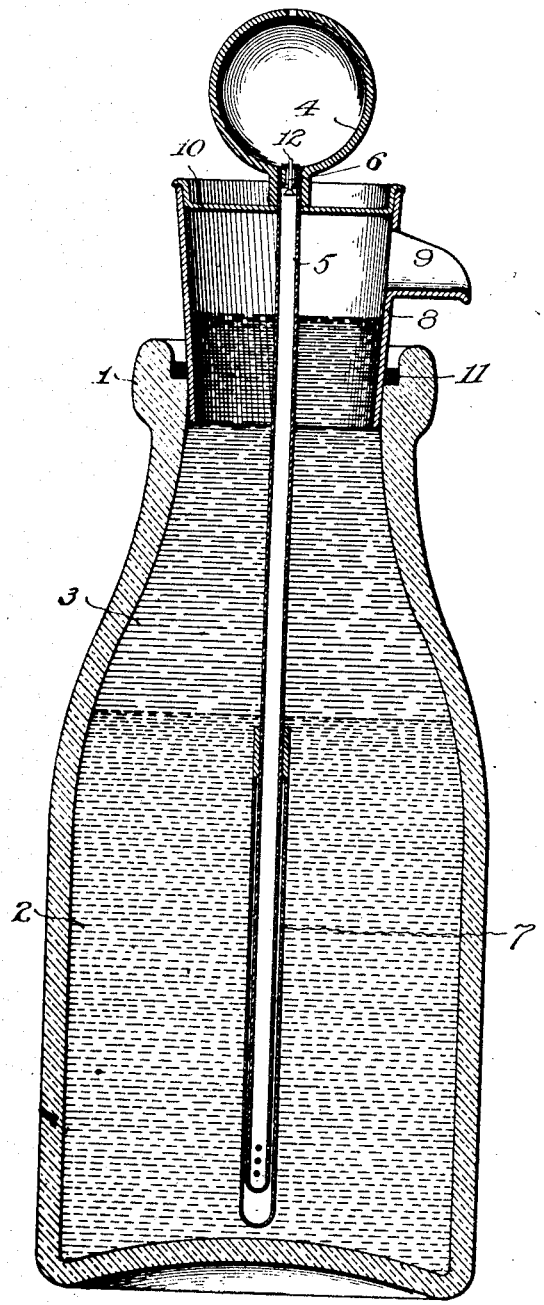
Figure 2:
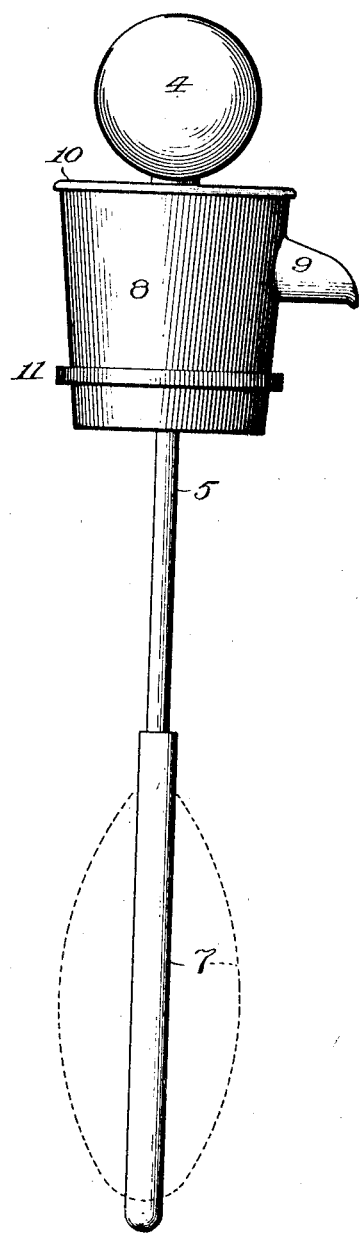

I will describe my invention by reference to the accompanying drawing, which represents the preferred form thereof, Figure 1 being a vertical sectional view of a bottle containing two liquids having different specific gravities, showing my improved pump in position to be operated, and Fig. 2 is a view in elevation of the pump showing the bag in its normal condition in full lines, and partially expanded in dotted lines.

Like letters of reference represent like parts wherever shown.

The bottle 1 is shown containing milk 2 and cream 3 in about the proportion found with ordinary milk as delivered by dairies. The pump, which comprises a compression chamber or ball 4, is mounted upon the upper end of a tube 5. Within this tube, at its upper end, is a valve 6 which seats against back pressure to maintain the expansion of the bulb 7 secured over the lower end of said tube. As shown in Fig. 1, the bag 7 is secured well up on the tube 5, so that as said bulb is inflated it will be held down in place by the lower end of the tube. The tube 5 is perforated near its lower end, and is preferably made with said lower end rounded to prevent puncturing said bulb.

The upper part of the device comprises a hollow stopper 8, having a lip or spout 9 formed in its side near the top thereof, preferably metallic, but may be made of any suitable material, and having fitted into its top opening a cap 10 which is perforated to allow the tube 5 to be inserted therein. The stopper 8 is made tapering to fit the ordinary commercial milk bottle, and the washer 11 is simply provided to insure a perfectly tight joint to prevent the cream or other liquid from being forced up between the stopper and the bottle. The cover or cap 10 is held in place by binding against the stopper, and is not otherwise fastened, thus making it easily removable.

It may be readily understood that any desired quantity of the cream may be removed, either a few drops or in its entirety, simply by placing a finger over the top of the ball and pressing downwardly, thus forcing the air down through the valve 6 into the expansible bulb 7. When the ball is released the back pressure from the bulb is sufficient to close the valve 6. This operation may be repeated until all the cream is exhausted.

When it is desired to remove the pump from the bottle the bulb may be deflated by pressing in upon the side of the ball and opening the valve, said valve having a plunger 12 extending therethrough for that purpose.

While I have described a preferred form of my invention, I do not wish to limit myself to the exact details of constructions herewith shown, nor do I wish to limit myself to using it simply upon milk bottles, as I realize that it may be used for numerous other purposes. But I deem as new and desire to secure by Letters Patent 1. The combination with a bottle or other receptacle, of a pump comprising a compression chamber and an expansion chamber, a tube connecting said compression and expansion chambers, and a hollow stopper having a cover adapted to support said pump, substantially as described.

2. The combination with a receptacle, of a compression pump, a stopper having a spout, a cover for said stopper, a tube passing through said cover, said tube having a compression chamber mounted upon its upper end, and an expansible bulb on its lower end, substantially as and for the purpose specified.

3. In combination with a receptacle, a tapering, hollow, metallic stopper having a spout, a cover, a tube passing through said cover, said tube having perforations near its lower end and having said lower end inclosed within an expansible bulb.

4. In combination with a bottle or other receptacle, a stopper having a spout, a cover, a tube passing through said cover, a compression chamber, an expansion chamber, and a washer surrounding said stopper to insure a perfect fit between said stopper and said bottle.

In witness whereof I hereunto subscribe my name this 3rd day of June, A. D., 1907.

MILTON J. HENRY.

Witnesses:
 CLARENCE E. SMITH,
 FRANK LEAVENWORTH.